(No Model.)
H. BLATTNER.
SURVEYOR'S TRANSIT.
No. 264,061. Patented Sept. 12, 1882.
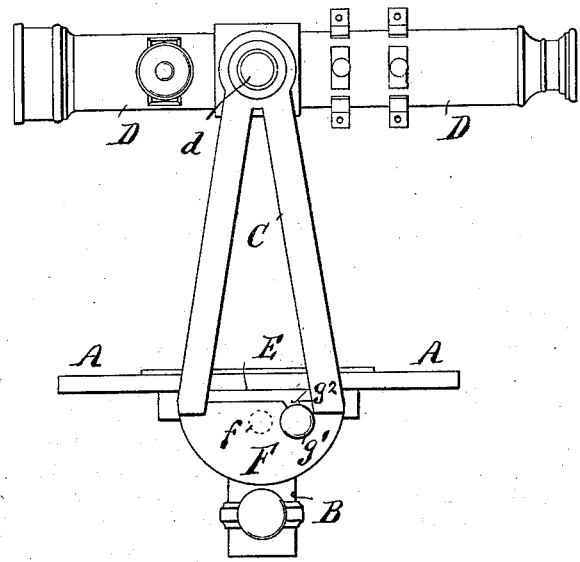
Fig. 1.
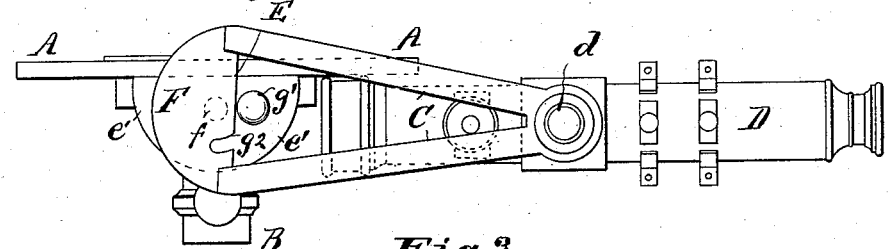
Fig. 2.
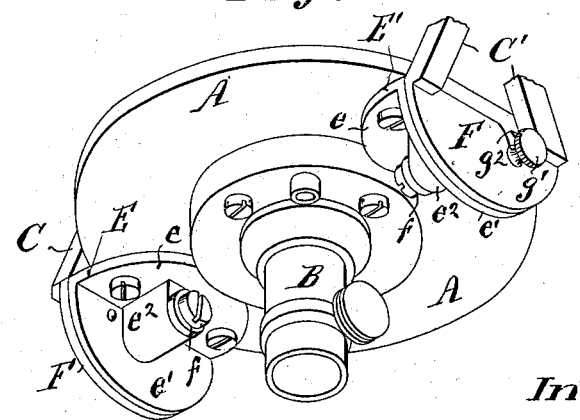
Fig. 3.
Attest:
Charles Pickles
John W. Herthel
Fig. 4.
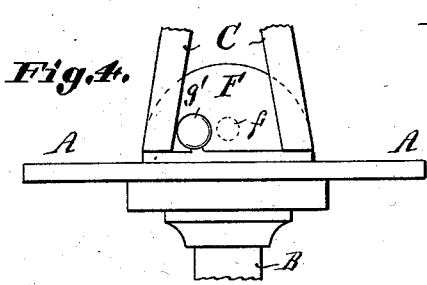
Inventor:
Henry Blattner
per Herthel & Co
Atty's

UNITED STATES PATENT OFFICE.

HENRY BLATTNER, OF ST. LOUIS, MISSOURI.

SURVEYOR'S TRANSIT.

SPECIFICATION forming part of Letters Patent No. 264,061, dated September 12, 1882.

Application filed June 3, 1882. (No model.)

*To all whom it may concern:*

Be it known that I, HENRY BLATTNER, a citizen of the United States, residing at St. Louis and State of Missouri, have invented a new and useful Engineer's and Surveyor's Transit, &c., of which the following is a specification.

This invention relates to improvements in the class of engineering and surveying instruments such as surveyors' and engineers' trans its, vernier-transits, surveying-compasses, &c. The instruments or transits named, as is well known, have a telescope with its axis capable of turning in the journals of uprights or standards, and the latter are a permanent fixture of or made rigid to the main plate, which carries the compass parts, &c. To the under side of the main plate is a socket to support the instrument upon a tripod-stand.

My invention chiefly consists in connecting the lower ends of the uprights or standards to the main plate by journal and journal-bearings, by means whereof the said standards, together with the parts they carry—such as the telescope, &c.—can be made to turn downward or upward—that is to say, the standards, &c., can be turned and secured in proper position to apply and use the transit or instrument, also be capable of the further novel action of being turned downward (with the parts said standards carry) to a position that causes the instrument to occupy less space, be better adapted and protected for packing purposes, and otherwise rendered more convenient and safe for portable uses. I accomplish the said objects by the mechanism illustrated in the accompanying drawings, in which—

Figure 1 is a side elevation of an ordinary vernier-transit, the standards being shown journaled to the main plate and secured in upright condition by a binding-screw, the said position being the proper one to apply the instrument for use. Fig. 2 is a side elevation of the same parts represented in Fig. 1, but shown in the turn-down position said parts are capable of assuming by virtue of the journal-connection between the standards and main plate. It is when in the said position that the instrument can be the better packed or made portable. Fig. 3 is an enlarged perspective view of the under side of the main plate to better illustrate my invention—viz., the two journal-connections between the said plate and its standards. Fig. 4 is a detail side elevation of a modification of my invention, and to show that the journal connections between the standards and main plate can be made above the latter as well as under same.

Similar letters refer to similar parts throughout the several views.

A represents the main plate. B is its socket-piece to engage and be secured to the top of the tripod-stand, upon which the instrument is mounted.

C C′ represent the standards, one on each side of the main plate. (See Fig. 3.)

D represents the telescope; $d$, its axis, the ends of which turn in bearings top of the standards. (See Figs. 1 and 2.)

Top of the main plate is the compass, vernier, &c., and otherwise said parts just described are those belonging to an ordinary vernier-transit.

My improvements consist mainly in journaling the standard or standards to the main plate, so that the former, carrying the telescope, can be adapted to assume a new and advantageous position, as will hereinafter appear.

To carry out my invention I provide journal-bearings E E′, each consisting of right-angle related horizontal and vertical face-plates $e\ e'$, and further forming part of it the journal-bearing $e^2$ proper, as more clearly shown in Fig. 3. By means of screw-fastenings passing through the horizontal face $e$ each journal-bearing E E′ can be secured either top of or to the under side of the main plate. (See figures.) The arrangement of each journal-bearing E E′ is preferably at the opposite sides or edges of the main plate, so as not to interfere with the parts constituting the transit or instrument, and so that the vertical face of each journal-bearing shall project in line with the lower part of the respective standards.

To the lower ends of the standards C C′, I secure, or form part thereof, a counterpart vertical plate, F, that carries the pintle or journal $f$ proper. (See figures.) This journal $f$ of the standards is fitted to engage respectively the journal-bearings $e^2$, and when properly secured thereto said journals can turn in their bearings. The standards C C′ thus journaled to the bearings fixed or forming part of the main plate can be turned in either direction, upward or downward. When turned upward to occupy or assume the ordinary position to support the telescope and parts for use, (see Fig. 1,) the standards can be prevented from further turning and secured in proper stationary position by the binding-screws $g'$ $g'$ and an open-faced slot at $g^2$ $g^2$, which are shown made in the outer face-plates, F. (See figures.) In turning the standards to an upright position the slots come in line with their binding-screws, and the latter engage and can be made to bind both vertical plates F and $e'$ firmly together. When the screws $g'$ $g'$ are loosened the operator can turn the standards and telescope downward and cause the said parts to assume the position shown in Fig. 2. It is when in the latter condition that the instrument is rendered more portable, can be the better packed, occupying less space, and otherwise more safely and conveniently handled.

What I claim is—

1. In an engineer's or surveyor's transit-instrument, the combination of the compass or main plate A with the standard or standards carrying a telescope journaled to the said plate, by means whereof the said standard or standards and the telescope can be turned either downward or upward, as and for the purposes set forth.

2. In combination with the main plate A, having journal-bearings, the standards C C', having journals to engage and turn in said bearings, the slots, and binding-screws by means whereof the said parts can be secured from turning, as and for the purposes set forth.

3. In combination with the main plate A, the journal-bearings E E', each consisting of the vertical and horizontal right-angle related plates $e$ $e'$, having journal-bearing $e^2$, and the standards C C', having bearing-plate F, carrying the journal or pintle $f$, all said parts operating as and for the purposes set forth.

4. In combination with the main plate A, the journal-bearings E E', each consisting of the right-angle plates $e$ $e'$, having journal-bearing $e^2$, the standards C C', having bearing-plate F, the journal $f$, the slot $g^2$, and binding-screw $g'$, all said parts operating as and for the purposes set forth.

In testimony of said invention I have hereunto set my hand.

HENRY BLATTNER.

Witnesses:
 FRANK ADAM,
 WILLIAM W. HERTHEL.